US011620399B2

(12) United States Patent
BenHanokh et al.

(10) Patent No.: US 11,620,399 B2
(45) Date of Patent: Apr. 4, 2023

(54) END-TO-END ENCRYPTION WITH DATA DEDUPLICATION

(71) Applicant: RED HAT, INC., Raleigh, NC (US)

(72) Inventors: Gabriel Zvi BenHanokh, Tel-Aviv (IL); Orit Wasserman, Mitzpe Aviv (IL)

(73) Assignee: Red Hat, Inc., Raleigh, NC (US)

( * ) Notice: Subject to any disclaimer, the term of this patent is extended or adjusted under 35 U.S.C. 154(b) by 138 days.

(21) Appl. No.: 17/101,138

(22) Filed: Nov. 23, 2020

(65) Prior Publication Data
US 2022/0164462 A1 May 26, 2022

(51) Int. Cl.
G06F 21/62 (2013.01)
G06F 3/06 (2006.01)
G06F 21/60 (2013.01)
H04L 9/08 (2006.01)

(52) U.S. Cl.
CPC .......... *G06F 21/6218* (2013.01); *G06F 3/067* (2013.01); *G06F 3/0608* (2013.01); *G06F 3/0641* (2013.01); *G06F 21/602* (2013.01); *H04L 9/0833* (2013.01)

(58) Field of Classification Search
CPC .. G06F 21/6218; G06F 3/0608; G06F 3/0641; G06F 3/067; G06F 21/602; G06F 21/62; G06F 3/06; G06F 21/60; H04L 9/0833; H04L 9/08
See application file for complete search history.

(56) References Cited

U.S. PATENT DOCUMENTS

| 8,930,687 | B1 | 1/2015 | Robinson et al. |
| 2020/0127983 | A1* | 4/2020 | Asghar ............... H04L 12/4641 |
| 2020/0177382 | A1 | 6/2020 | Perlman et al. |
| 2020/0293212 | A1 | 9/2020 | Narayanamurthy et al. |

(Continued)

FOREIGN PATENT DOCUMENTS

CN 109783456 A 5/2019

OTHER PUBLICATIONS

Fuhry, B., et al., "SeGShare: Secure Group File Sharing in the Cloud using Enclaves," 50th Annual IEEE/IFIP International Conference on Dependable Systems and Networks, 2020, http://www.fkerschbaum.org/dsn20.pdf.

(Continued)

*Primary Examiner* — Quazi Farooqui
(74) *Attorney, Agent, or Firm* — Kilpatrick Townsend & Stockton LLP

(57) ABSTRACT

Aspects and features of the present disclosure can provide encryption to maintain data privacy while allowing deduplication of some client data by or cloud-based storage platforms. Data can be identified as public data and left unencrypted so that it can be deduplicated. Other data can be identified as personal data, which can be encrypted with a personal key, or as group data, which can be encrypted with a shared, group key. Identifying the data can include storing the data in storage regions within a closed environment. The storage regions can be established, at the client, in a storage platform, or both. Optionally, a storage platform can include multiple storage regions for multiple groups of users, wherein each group is assigned its own unique encryption key. Such data can thus automatically be subject to the same deduplication routines as unencrypted data.

20 Claims, 4 Drawing Sheets

(56) References Cited

U.S. PATENT DOCUMENTS

2020/0302088 A1* 9/2020 Lee .................... H04L 63/0807
2022/0027483 A1* 1/2022 Hetzler .................. G06F 21/62
2022/0121359 A1* 4/2022 Butcher ............. G06F 9/30047

OTHER PUBLICATIONS

Stanek, J., et al., "A Secure Data Deduplication Scheme for Cloud Storage," Czech Technical University in Prague, Prague, Czech Republic and IBM Research, Zurich, Switzerland, 2014, https://link.springer.com/chapter/1.0.1007/978-3-662-45472-5_8.
Stanek, J., et al., "Enhanced Secure Thresholded Data Deduplication Scheme for Cloud Storage," IEEE Transactions on Dependable and Secure Computing, 2015, https://ieeexplore.ieee.org/abstract/document/7553458.

* cited by examiner

END-TO-END ENCRYPTION WITH DATA DEDUPLICATION

TECHNICAL FIELD

The present disclosure relates generally to managing data in storage systems. More specifically, but not by way of limitation, this disclosure relates to encryption techniques that provide storage efficiency as well as data security in multi-user storage platforms.

BACKGROUND

A cloud-computing system includes clusters to which various applications are deployed. A storage platform is an example of such an application. Storage platforms can be used by client devices or cloud computing clusters for storage expansion, redundant storage, or cloud-based backup. Storage systems can be configured to work with client applications. As an example, a data backup service provider may develop a mass storage application for deployment in a cloud-computing network, and may also develop and deploy a backup application to be installed in other parts of the network or on servers to make use of the mass storage cloud-network application.

DETAILED DESCRIPTION

Figure 1:
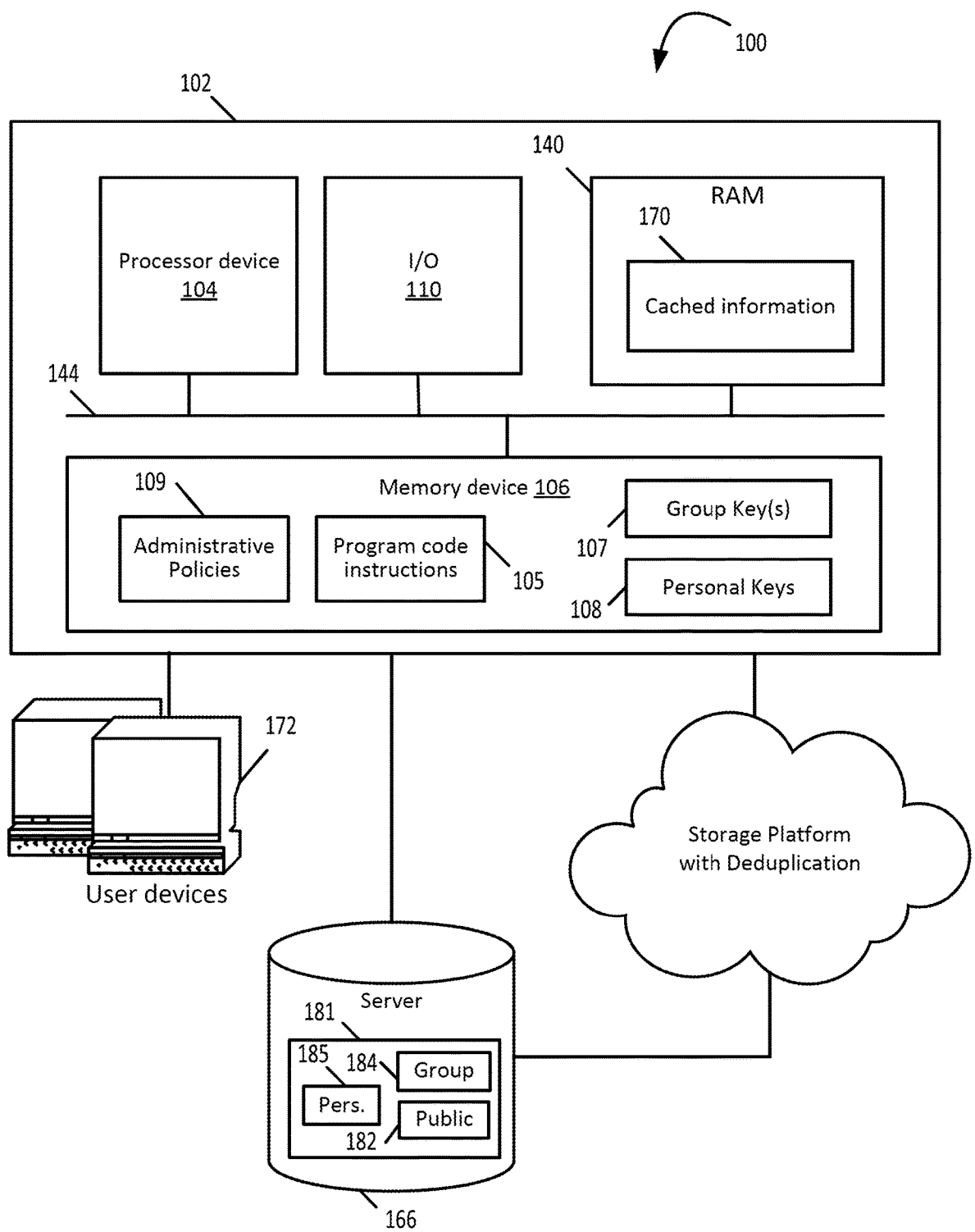
FIG. 1 is a block diagram of an example of a system that provides end-to-end encryption while allowing data deduplication according to at least some aspects of the disclosure.

Some mass storage systems are configured to continuously deduplicate stored data to minimize storage space and costs, and to improve the processing efficiency of accessing data records. When a new data block is added to the storage system, and the data block is verified to be identical to an existing data block, the new data block is not written into the storage system, but rather references to the data block are updated. Thus, space is not wasted storing the duplicate data block over again for another user.

Deduplication can be performed among data blocks stored by the same client and among data blocks stored by different clients. For example, a backup application that copies data from client devices to a cloud-based, mass-storage platform can back up identical copies of support files, applications, or operating system files from multiple clients. The storage space taken up by such files can be significantly reduced through deduplication. However, data that is end-to-end encrypted using symmetric, individually-assigned key pairs independent of any security implemented in the storage platform itself may not be subject to deduplication, since each client's data, even if identical when created, is unique after encryption. Increased use of end-to-end encryption can thus result in decreased deduplication and increased storage requirements for storage providers. End-to-end encryption may also adversely impact read and write performance since each block of data is written and read for each unique user's data.

Some examples of the present disclosure overcome one or more of the issues mentioned above through identifying some client data as less sensitive than other client data. Data may be identified as less sensitive or more sensitive by a client application. On some examples, the client is a cloud-based client such as a server or container using administrative policies, system software that manages containers, or a combination of the two. Analytics can also be applied to identify high-sensitivity and low-sensitivity data, for example through a backup application provided by a storage service provider. Data may also be identified by tools and policies deployed at the level of the storage platform. For low-sensitivity data, for example, data that is otherwise public, encryption can be skipped so that this public data can be sent to a storage platform unencrypted. This public data can be deduplicated at the storage platform.

For medium-sensitivity data, an encryption key pair that provides end-to-end encryption outside of the storage platform can be shared among a group of clients of the storage platform rather than being personally assigned to an individual client. Since multiple clients can use the same group key for end-to-end encryption of this group-encryptable data, such shared data duplicated across client systems will encrypt as identical data blocks. This data can be automatically subject to the same deduplication routines as unencrypted data even though the storage platform operates independently of the encryption provided by the group key. The storage platform can store and deduplicate this data without modifications, notifications, or access to any part of the group key.

In some examples, one or more processor devices in a cloud resource network can identify public data blocks that do not require encryption. Public data blocks, as examples, might include operating system code and application software code, or other low-sensitivity data. Other data blocks can be encrypted. Data blocks transmitted to a storage platform can include both the unencrypted and the encrypted data blocks. The unencrypted data blocks can be deduplicated.

In some examples, one or more processor devices can acquire a group encryption key, for example, as part of a key pair obtained from a trusted internal or external provider. The group encryption key can be accessed and applied to medium-sensitivity data from multiple clients so identical client data can be deduplicated. A processor device can use the group encryption key for the medium-sensitivity data blocks, also referred to as group-encryptable data blocks. When the processor device sends data blocks to the storage platform, the data blocks can include the data blocks encrypted using the group encryption key, some of which may be identical despite being encrypted, and therefore may be subject to deduplication.

For high-sensitivity data, a processor device can use a personal encryption key for encrypting such data. High-sensitivity data will not be deduplicated on independent storage platforms, but the security level of high-sensitivity data may justify the loss of deduplication capability for the selected high-sensitivity data blocks. Examples of such data include system configuration information, permissions, browser histories, credentials, and encryption keys themselves.

Identifying the data can include storing the data in storage regions within a client that runs in a closed environment like a container or virtual machine. Each storage region corresponds to the level of security. By running the client in a closed environment, data can be segregated as necessary. The storage regions can be established, at the client, in a storage platform, or both. A storage region may also be referred to as a domain. Optionally, a storage platform can include multiple storage regions for multiple groups of clients, wherein each group is assigned its own unique encryption key. Such data can thus automatically be subject to the same deduplication routines as unencrypted data.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system that provides end-to-end encryption while allowing data deduplication according to some aspects of the disclosure. More specifically, the system 100 includes a computing device 102. Computing device 102 can execute software, which causes the computing device to perform the tasks of identifying low-sensitivity data that may be sent to a storage platform without encryption and encrypting other data. Software can include computer-readable instructions that are executable by a processor device such as processor device 104, such as program code instructions 105. The system can be programmed in any suitable programming language, such as Java, C++, C, Python, or any combination of these.

In FIG. 1, computing device 102 includes the processor device 104, memory device 106, an input/output (I/O) module or modules 110, and a random-access memory (RAM) 140. A bus or interconnect 144 is also provided to allow for inter- and intra-device communications using, for example, I/O module 110. I/O module 110 can include a network interface (not shown), which in turn communicates with storage platform 150. The network interface can also connect computing device 102 to servers such as server 166, which in this example can make up at least a portion of a hardware cluster for a cloud resource network. Server 166 and other nodes in such a network can include a processor device, a memory device, I/O, and other components similar to computing device 102 and other typical computing devices.

Still referring to FIG. 1, computing device 102 in this example can be a server that implements a portion of the cloud resource network, for example, a server that implements a pod file system and containers for a cloud computing system based on a container orchestration platform such as Kubernetes™ or OpenShift™. Such a server can be a client of the storage platform 150, which is configured to perform deduplication. Such a server can also provide a closed environment where the data can be segregated as necessary. Alternatively, computing device 102 and be a secured administrative server or workstation that performs tasks connected with data backup, including identifying low-sensitivity, medium-sensitivity, and high-sensitivity data within an enterprise, as well as acquiring encryption keys. Such an administrative server or workstation can also be a client of the storage platform 150. Public data can be sent to storage platform 150 without encryption so that public data blocks are subject to deduplication.

A group key can be assigned across multiple clients to allow eventual deduplication of medium sensitivity data across clients of the storage platform 150. In the example of an administrative server for an enterprise, the group key may be shared with other enterprises or individual clients' data to provide for more deduplication. One or more group keys 107 are maintained in memory device 106. In this example, personal keys 108 are also acquired for the encryption of high-sensitivity data. Memory device 106 also includes administrative policies 109. Administrative policies may be used for the determination of which blocks of data are to be treated as private or personal data and which blocks of data are to be treated as group-encryptable data, as well as which blocks of data are to be treated as public data blocks for cloud storage or backup purposes. The policies can be updated by system administrators as resources change, data is generated, and applications are acquired or retired.

In the example of FIG. 1, cached information 170, such as keys in use, and other information used by system 100 may be stored in RAM 140. In addition to connecting computing device 102 to a cloud network and to storage platform 150, I/O module 110 also connects computing device 102 to user devices 172, which may be a personal computer, smartphone, tablet computer, or some other type of client device. User input can be received by computing device 102 through user device 172. User input and display functions can alternatively or additionally be provided through peripherals (not shown) locally attached to computing device 102.

The determinations as to whether data is medium-sensitivity or group data, which data is low-sensitivity or public data, or which data is high-sensitivity or personal can be made through analytics used by an application provider, by identifying the data using administrative policies, or by system software that manages containers. Determinations can be made by templates, administrator definitions, user self-management, or a process that can recognize data sections. A combination of techniques may be employed.

A system, such as the system in the example described above, can be used to provide end-to-end encryption while allowing for deduplication without modifications to the storage platform. The deduplication of group data can be carried out independent of, or without knowledge of the group encryption key. A technique can be used for container splitting in the pod file system of client server 166 to provide separate regions for storage of data of different security levels and encryption categories, providing a closed environment that can be controlled to segregate data. Container 181 in server 166 includes first storage region 182 for public (low-sensitivity) data and the data in this storage region can remain unencrypted so that it is subject to deduplication in storage platform 150. Second storage region 184 is established, maintained, and known in advance to accommodate group-key-encrypted data, which is also subject deduplication in storage platform 150. Container 181 in pod 166 also includes third storage region 185 for high-sensitivity data encrypted with personal keys.

Storage platform 150 can optionally include dedicated storage regions that mirror those described above. Since there may be little duplicate data in a storage region for high-sensitivity data, the storage platform does not even need to attempt deduplication for data from storage region 185. Optionally, multiple groups of clients, each with a uniquely assigned group encryption key, may be maintained, and a storage region can be assigned to each group, either at the client server 166, in the storage platform 150, or in both the client server and the storage platform. In such an example, group key pairs can be shared with a target storage platform after public key negotiation and data encrypted with a group key will implicitly be a candidate for deduplication. The personal keys in this example are not shared with the target storage platform. The storage platform can implicitly skip deduplication for this personal data, firstly because this data is likely to be stored as random data blocks and secondly, the underlying data blocks are more likely to be unique. Optionally, to ensure this uniqueness, clients can be forced to leave NULL data unencrypted and to use write-same/write-zeros commands.

Examples of public data for which encryption is not needed include operating system code such as that for Windows™ or Linux, and application code such as that for Apache™, Oracle™, or Exchange™. This data can be deduplicated among all clients of the storage platform 150. Group-shared data in this example is encrypted with the shared, group key and can be deduplicated among members of the group. Multiple unrelated groups can be supported in a storage platform, and each may have a storage region in a container such as container 181. A region for high-sensitivity data includes, as examples, personal and private data. This data is typically highly secured by a personal encryption key and cannot be deduplicated by the storage platform 150.

When the cloud resource network is configured with multiple storage regions, a cloud application can automatically use special tags in the data specification to distinguish between group-encryptable, high-sensitivity, and public data so that the group encryption key can remain unknown to the storage platform. Data blocks can be stored automatically in the corresponding storage region when building an image of client data. If the application provides a path specification, the image building process can validate region placement. At least some of the encryption can take place at a container in the storage platform, or in a virtual machine. The encryption can be accomplished either internally or by sending the data to external hardware. In the latter example, the encryption key can be passed by the external hardware, or the external hardware can mark data for the appropriate security level while the container or virtual machine deals with encryption keys.

In some examples, a container can be provisioned to use different persistent volumes (PVs) for the storage regions. The first PV can be a protected PV that includes high-sensitivity data, and additional PVs can include low-sensitivity data, and public data. The container application can be modified to be aware of the PVs and ensure that high-sensitivity data is only stored in the protected PV, which is not subject to deduplication.

Figure 2:
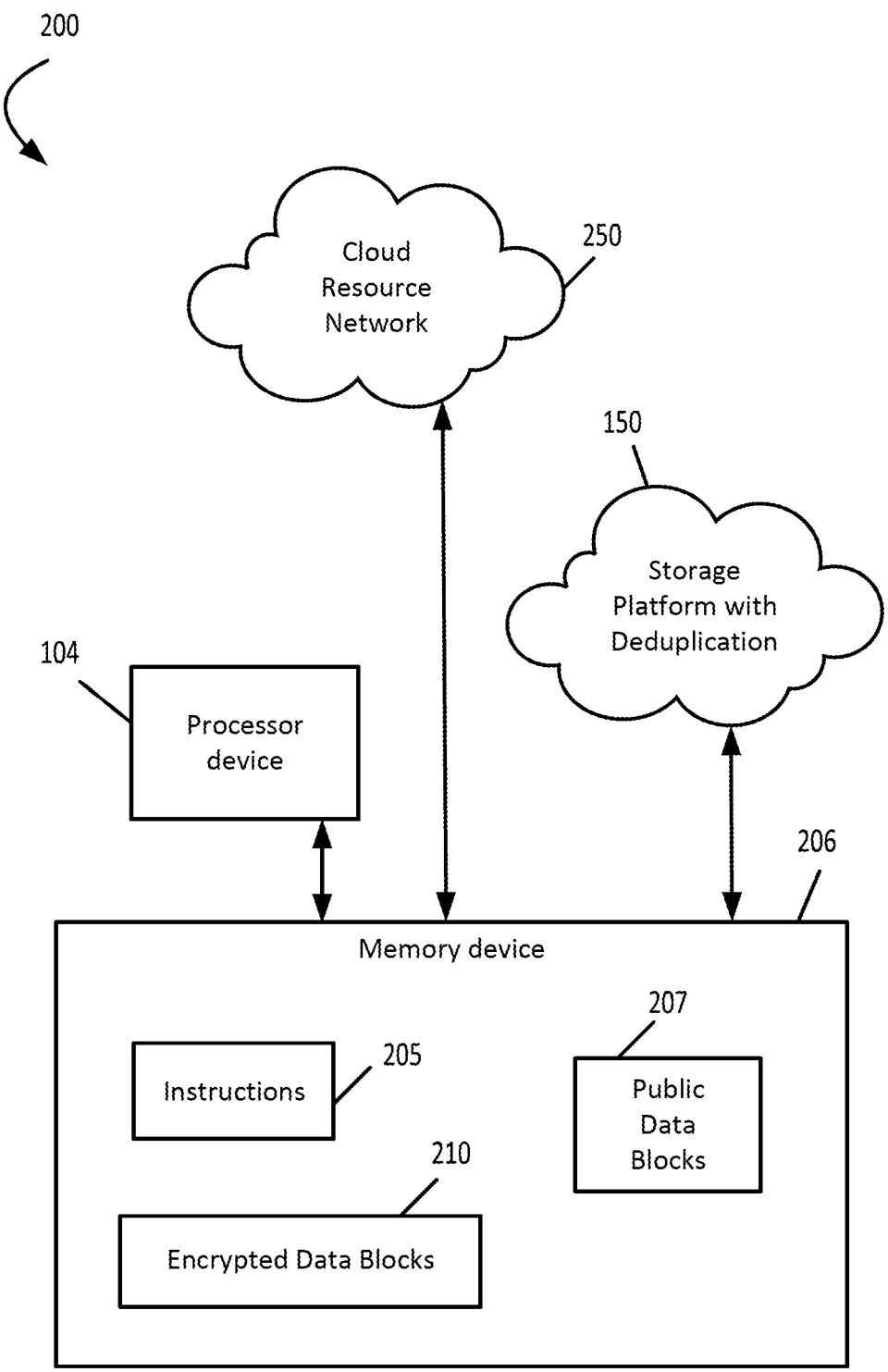
FIG. 2 is a block diagram of another example of a system that provides end-to-end encryption while allowing data deduplication according to at least some aspects of the disclosure.

FIG. 2 is a block diagram of an example of a system that includes program code to enable end-to-end encryption while allowing data deduplication according to one aspect of the disclosure. The system 200 includes the processor device 104 that can execute computer program code, also referred to as software, instructions, or program code instructions 205, for performing operations related to identifying public data blocks, and for acquiring a group key and providing encryption with the group key for group-encryptable data. For example, instructions 205 can be included in a backup application. Processor device 104 is communicatively coupled to the memory device 206. The processor device 104 can include one processor device or multiple processor devices. Non-limiting examples of the processor device 104 include a field-programmable gate array (FPGA), an application-specific integrated circuit (ASIC), a microprocessor, etc. Software can include computer-readable instructions that are executable by a processor device 104, such as program code instructions 205. The system can be programmed in any suitable programming language. Just a few examples are Java, C++, C, and Python.

The processor device 104 of FIG. 2 can execute one or more operations. These operations include identifying public data blocks 207, encrypting data blocks, and sending both unencrypted public data blocks and encrypted data blocks 210 to a storage platform 150. Processor device 104 and memory device 206 can be installed in a server that is part of cloud resource network 250. Cloud resource network 250 can include multiple servers that maintain containers using container orchestration techniques and that run a pod file system.

Still referring to FIG. 2, memory device 206 can include one memory device or multiple memory devices. The memory device 206 can be non-volatile and may include any type of memory device that retains stored information when powered off. In some examples, at least some of the memory device can include a non-transitory computer-readable medium from which the processor device 104 can read instructions 205. A computer-readable medium can include electronic, optical, magnetic, or other storage devices capable of providing the processor device with computer-readable instructions 205 or other program code. Non-limiting examples of the memory device 206 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

Continuing with FIG. 2, the memory device and the processor device shown may be a portion of a computer system or of a server or similar computer system or multiple computer systems that also include an input/output (I/O) module, a random-access memory, and a bus or interconnect (not shown). The I/O module can include a network interface (not shown), which in turn communicates with cloud resource network 250. The I/O module can also receive input from an administrator related to identifying data blocks.

Figure 3:
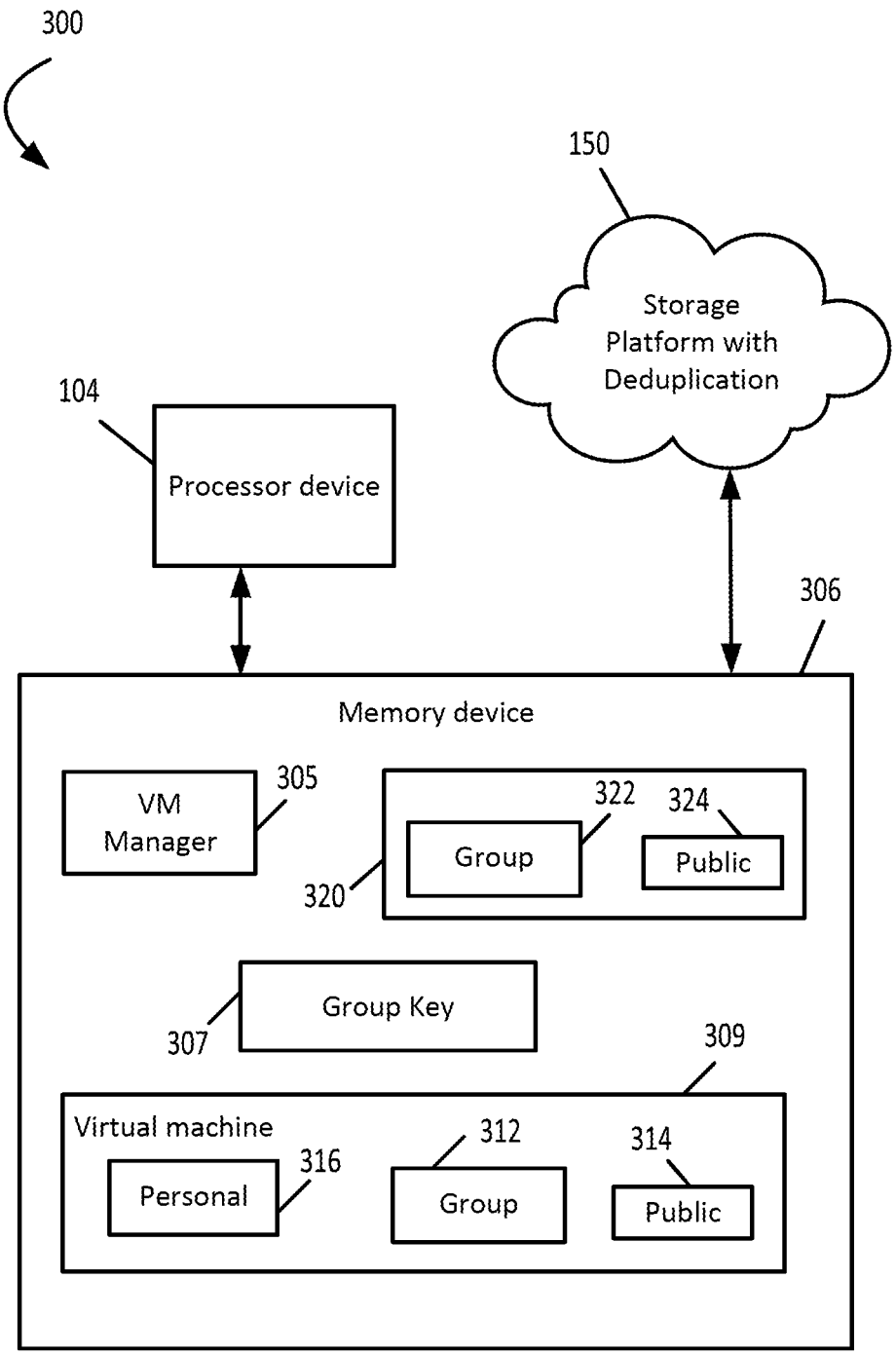
FIG. 3 is a block diagram of an additional example of a system that provides end-to-end encryption while allowing data deduplication according to at least some aspects of the disclosure.

FIG. 3 is a block diagram of another example of a system that includes program code to enable end-to-end encryption while allowing data deduplication according to at least some aspects of the disclosure. The system 300 includes the processor device 104 that can execute computer program code, also referred to as software, instructions, or program code instructions for performing operations related to segregating data, acquiring a group key and providing encryption. In system 300, the computer program code is part of virtual machine (VM) manager 305. VM manager 305 maintains a closed environment wherein data can be segregated. VM manager 305 maintains a virtual machine 309 holding an operating system and applications. Group-encryptable data 312 can also reside in virtual machine 309. The operating system and applications in system 300 constitute low-sensitivity data identified as public data 314 in virtual machine 309 or public data 324. The VM manager 305 can mark such data stored in memory device 306 accordingly, and can also mark high-sensitivity, personal data 316. Thus, the VM manager 305 can take advantage of storage region optimizations previously discussed.

The VM manager 305 in this example is responsible for encrypting group-encryptable data blocks using group key 307. The VM manager 305 manages real-time execution for applications running in virtual machine 309. The VM manager can create a single copy of shared data 320 for use by and among multiple virtual machines. Since this data is shared among users, a certain amount of deduplication is carried out as a byproduct of the normal operation of system 300. Shared data 320 can include group-encryptable data 322 and public data 324. High-sensitivity data that would be encrypted for storage using a personal key may be stored separately from the shared data 320, in virtual machine 309 as personal data 316 or otherwise.

In some examples, the VM manager may run on a server that maintains containers in a cloud resource network so that a virtual machine resides in the container. In other examples, the VM manager may be a hypervisor running in a server outside of a cloud resource network. If a system like that shown in FIG. 3 is part of a virtual machine cluster, end-to-end encryption that provides for deduplication can be carried out on a larger scale. A group key 307 can be assigned among many users or can be used for all of the machines in the cluster. With cluster-based key sharing, the benefits of storage platform deduplication can be realized even if the group key is not assigned beyond the cluster.

Figure 4:
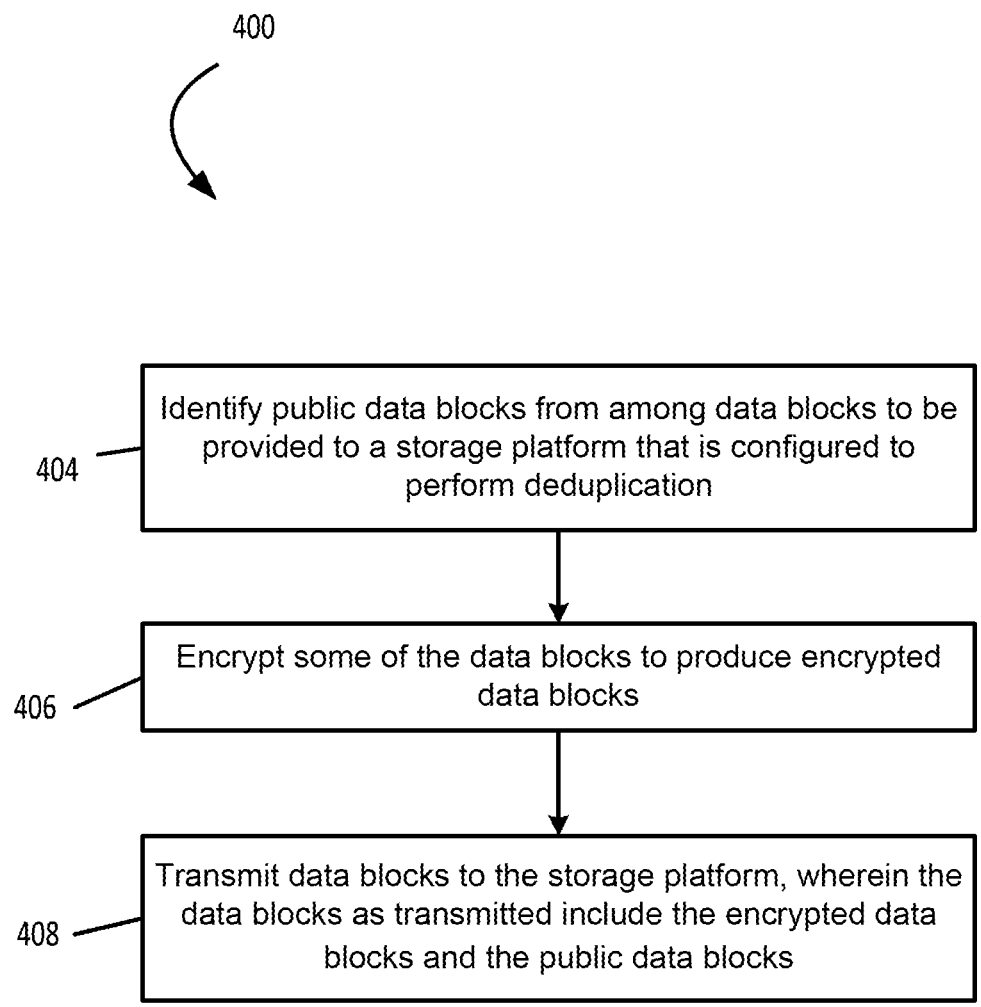
FIG. 4 is a flowchart of an example of a process for providing end-to-end encryption while allowing data deduplication according to at least some aspects of the disclosure.

In some examples, a processor device such as processor device 104 can perform one or more of the operations shown in FIG. 4 to provide encryption with deduplication according to some aspects of the disclosure. The processor device 104 also maintains a closed environment and segregates data as necessary. In other examples, the processor device can implement more operations, fewer operations, different operations, or a different order of the operations depicted in FIG. 4. Process 400 of FIG. 4 is described below with reference to components discussed above.

At block 404, a processor device such as processor device 104 identifies public data blocks from among data blocks to be provided to a storage platform that is configured to perform deduplication. At block 406, the processor device encrypts some of the data blocks to produce encrypted data blocks. For example, processor device 104 can acquires one or more encryption keys, including at least a group encryption key such as group keys 107 or 307. The group key can be assigned across multiple clients to allow eventual deduplication across those clients. Public data blocks can also be deduplicated across clients. No part of the group key, not even the public key part of a symmetric key pair, needs to be shared with the storage platform. End-to-end encryption in this example can take place independently of the operation of the storage platform.

The processor device can identify at least some data blocks to be sent to a storage platform as low-sensitivity data, as compared to other data, for example, medium-sensitivity or high-sensitivity data. Low-sensitivity data can include public data. Medium-sensitivity data can include data that is encrypted using a group encryption key. High-sensitivity data can include personal data that is encrypted with a personal key.

At block 408, the processor device transmits data blocks to the storage platform, wherein the data blocks as transmitted include the encrypted data blocks and the unencrypted, public data blocks. In this example, little is lost by giving up encryption for personal, or high-sensitivity data, since even without encryption, this data will tend to be more unique to each user. Low-sensitivity or public data will tend to be common, thus facilitating its deduplication in the storage platform will tend to provide a large savings in storage space. Group or medium-sensitivity data falls somewhere in between the two, both in terms of how commonly the data occurs across clients and how much storage space savings is provided.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor device; and
   at least one memory device including instructions that are executable by the processor device for causing the processor device to perform operations comprising:
      identifying, from among a plurality of data blocks to be provided to a storage platform that is configured to perform deduplication, public data blocks;
      identifying, from among the plurality of data blocks to be provided to the storage platform, group-encryptable data blocks;
      encrypting the group-encryptable data blocks using a shared, group encryption key to produce encrypted data blocks that include shared data blocks that have identical data subject to the deduplication among the shared data blocks; and
      transmitting the plurality of data blocks to the storage platform, wherein the plurality of data blocks as transmitted includes the encrypted data blocks and the public data blocks.

2. The system of claim 1, wherein the operations further comprise assigning the group encryption key to multiple clients of the storage platform.

3. The system of claim 2, wherein the operations further comprise:
   acquiring a personal encryption key;
   identifying, from among the plurality of data blocks to be provided to the storage platform, at least one high-sensitivity data block; and
   encrypting the at least one high-sensitivity data block using the personal encryption key;
   wherein the encrypted data blocks include the at least one high-sensitivity data block.

4. The system of claim 2, wherein the operations further comprise acquiring the group encryption key by a virtual machine manager for the group-encryptable data blocks residing in at least one virtual machine maintained by the virtual machine manager.

5. The system of claim 4, wherein the virtual machine manager comprises a hypervisor.

6. The system of claim 1, wherein the at least one memory device further includes a pod file system, and the operations further comprise:
   establishing a first storage region configured by the pod file system for the public data blocks subject to deduplication;
   establishing a second storage region configured by the pod file system for the group-encryptable data blocks; and
   establishing a third storage region configured by the pod file system for high-sensitivity data blocks.

7. The system of claim 6, wherein the at least one memory device further includes at least one persistent volume including at least one of the first storage region, the second storage region, or the third storage region.

8. A method comprising:
   identifying, by a processor device, from among a plurality of data blocks to be transmitted by a pod or a virtual machine in a cloud resource network to a storage platform that is configured to perform deduplication, public data blocks;

identifying, by the processor device, from among the plurality of data blocks to be transmitted by the pod or virtual machine to the storage platform, group-encryptable data blocks;

encrypting, by the processor device, the group-encryptable data blocks using a shared, group encryption key to produce encrypted data blocks that include shared data blocks that have identical data subject to the deduplication among the shared data blocks; and transmitting, by the processor device, the plurality of data blocks from the pod or virtual machine to the storage platform, wherein the plurality of data blocks as transmitted includes the encrypted data blocks and the public data blocks.

9. The method of claim 8, further comprising assigning the group encryption key to multiple clients of the storage platform.

10. The method of claim 9, further comprising:
acquiring a personal encryption key;
identifying, from among the plurality of data blocks to be provided to the storage platform, at least one high-sensitivity data block; and
encrypting the at least one high-sensitivity data block using the personal encryption key;
wherein the encrypted data blocks include the at least one high-sensitivity data block.

11. The method of claim 9, wherein acquiring the group encryption key comprises acquiring the group encryption key by a virtual machine manager for the group-encryptable data blocks residing in at least one virtual machine maintained by the virtual machine manager.

12. The method of claim 8, further comprising:
establishing a first storage region for the public data blocks subject to deduplication;
establishing a second storage region for the group-encryptable data blocks; and
establishing a third storage region for high-sensitivity data blocks.

13. The method of claim 12, further comprising establishing at least one persistent volume including at least one of the first storage region, the second storage region, or the third storage region.

14. A non-transitory computer-readable medium comprising program code that is executable by a processor device for causing the processor device to:
identify from among a plurality of data blocks to be transmitted by a pod or a virtual machine in a cloud resource network to a storage platform that is configured to perform deduplication, public data blocks;

identify, from among the plurality of data blocks to be transmitted by the pod or virtual machine to the storage platform, group-encryptable data blocks;

encrypt the group-encryptable data blocks using a shared, group encryption key to produce encrypted data blocks that include shared data blocks that have identical data subject to the deduplication among the shared data blocks; and transmit the plurality of data blocks from the pod or virtual machine to the storage platform, wherein the plurality of data blocks as transmitted includes the encrypted data blocks and the public data blocks.

15. The non-transitory computer-readable medium of claim 14, wherein the program code is executable by the processor device for causing the processor device to assign the group encryption key to multiple clients of the storage platform.

16. The non-transitory computer-readable medium of claim 15, wherein the program code is executable by the processor device for causing the processor device to:
acquire a personal encryption key;
identify, from among the plurality of data blocks to be provided to the storage platform, at least one high-sensitivity data block; and
encrypt the at least one high-sensitivity data block using the personal encryption key;
wherein the encrypted data blocks include the at least one high-sensitivity data block.

17. The non-transitory computer-readable medium of claim 15, wherein acquiring the group encryption key comprises acquiring the group encryption key by a virtual machine manager for the group-encryptable data blocks residing in at least one virtual machine maintained by the virtual machine manager.

18. The non-transitory computer-readable medium of claim 17, wherein the virtual machine manager comprises a hypervisor.

19. The non-transitory computer-readable medium of claim 14, wherein the program code is executable by the processor device for causing the processor device to:
establish a first storage region for the public data blocks subject to deduplication;
establish a second storage region for the group-encryptable data blocks; and
establish a third storage region for high-sensitivity data blocks.

20. The non-transitory computer-readable medium of claim 19, wherein the program code is executable by the processor device for causing the processor device to establish at least one persistent volume including at least one of the first storage region, the second storage region, or the third storage region.

* * * * *